United States Patent
Brunner et al.

(10) Patent No.: US 7,154,623 B2
(45) Date of Patent: Dec. 26, 2006

(54) METHOD AND APPARATUS FOR GENERATING IMAGES

(75) Inventors: Juergen Brunner, Munich (DE); Hans-Juergen Rauh, Strasslach-Hailafing (DE); Hans-Georg Schindler, Holzkirchen (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 927 days.

(21) Appl. No.: 09/948,396

(22) Filed: Sep. 7, 2001

(65) Prior Publication Data

US 2002/0034385 A1 Mar. 21, 2002

(30) Foreign Application Priority Data

Sep. 20, 2000 (DE) ................. 100 46 665

(51) Int. Cl.
*G06F 15/00* (2006.01)
*G06K 15/00* (2006.01)

(52) U.S. Cl. ..................... 358/1.15; 358/448

(58) Field of Classification Search ........... 358/302, 358/296, 1.12, 1.13, 1.15, 1.16, 1, 1.1, 1.9, 358/1.18, 448, 402, 474

See application file for complete search history.

(56) References Cited

U.S. PATENT DOCUMENTS 6,549,892 B1 * 4/2003 Sansone .................. 705/401
6,813,038 B1 * 11/2004 Kadowaki ................ 358/1.18

FOREIGN PATENT DOCUMENTS

| EP | 0683432 | 11/1995 |
| EP | 0893907 | 1/1999 |

* cited by examiner

*Primary Examiner*—Gabriel I. Garcia
(74) *Attorney, Agent, or Firm*—Milde & Hoffberg, LLP (57) ABSTRACT

Apparatus (1) for generating images includes a reading device (2, 7), an output device (22, 26), a sorting device (9) and a control device (21). Image information of several images (A1 to A6, AX, AY) is read from input media and image data is produced that contains the read image information. The input media are assigned to several image production orders. Using the output device (22, 26), the image information that has been transferred to this device is output onto recording material. The input media are physically sorted in the sorting device (9) by order according to at least one prescribed criterion. Using the control device (21) the sequence for transferring the image data of images can then be determined in dependence upon the previously carried out sorting by order of the read input media.

8 Claims, 4 Drawing Sheets

METHOD AND APPARATUS FOR GENERATING IMAGES

BACKGROUND OF THE INVENTION

The present invention relates to a method and apparatus for generating images. The apparatus for producing images includes a reading device, an output device, a sorting device and a control device. Image information of several images is read from input media and image data is determined that contains the read image information. The input media are assigned to several image production orders. Using the output device, the image information that has been transferred to this device is output onto recording material.

Such methods and apparatus are used, among other places, in large-scale laboratories, where photographic images are produced and generated. Photographic films containing numerous image negatives serve as input media that contain the image information of the images. The films arriving at the large-scale lab are processed in continuous-mode machines. For example, exposure of the image information contained in the film negatives onto photographic recording material such as photographic paper is carried out in photographic printers such as, for example, the AGFA MSP or the AGFA MSP DIMAX. Both printers are continuous-mode machines that can process both the film and the photographic paper in strip shape. Such continuous-mode machines provide a particularly good quality of the generated images, a low consumption of chemicals and low personnel costs.

For film to be processed in such continuous-mode machines, a film strip must be made that combines a multitude of films to one film strip. Such a combining of individual films into one continuous strip occurs in a so-called "splicer". The continuous strip of connected individual films is coiled into a roll of film. Such a roll of photographic film is generally called a batch. Such a batch remains connected during the entire process for generating the photographic images, and is only divided into the individual orders; that is, the individual films during the final processing step. During final processing, it is very important that all components that are assigned to one single production order are correctly arranged together. Such components of an individual order may be the order pocket of a film, the produced image print and an index print, for example. The customer—that is, the ordering party—is able to select between different alternatives for producing the images. For example, the reproduced images may be generated in different formats. Furthermore, different paper varieties are available that may, in particular, feature different surfaces (matte or glossy). To meet the different selections of the customers, the printers must be equipped with the various photographic papers. Because the configuration of the printer should not be changed continuously, for example to avoid downtime, the film batches must be assembled with as many films as possible for the same type of orders. Here, "same type" refers, in particular, to the type of photographic paper that is to be used.

To assemble batches, large-scale labs typically perform a pre-sorting of the received films according to the criteria mentioned above. Although presorting and assembling the individual films to a batch is safe and reliable, this method also has its disadvantages. For example, there is no access to individual orders as long as the batch has not been processed in its entirety. Typically, an individual photo shop sends numerous different orders to a large-scale lab in order to produce image prints corresponding to these orders. The shop is interested in receiving all orders back quickly. Thus, a short run time of all orders of a photo shop through the large-scale lab should be possible. However, this is problematic because the different orders of the photo shop will most likely be assigned to several different batches. Since it is not possible to process all batches simultaneously, individual orders of a photo shop that have already been processed must wait until the remaining orders of the photo shop are ready. Only then are all orders sent and shipped back to the photo shop together.

Some time ago, new structures for large-scale lab operations become known. For example, one such structure is described in the published European patent application EP 0 893 907 A1. According to this disclosure, several reading means for reading the input media via a so-called "bus" can be linked to several output means for outputting image information onto recording material. The image data generated by the reading means that contain the read image information can be transferred to one of the output means via the bus, based on the order-specific accompanying data that are provided to the known system for generating images together with the input media. To this end, a control device that controls the data flow of the reading means to the output means based on the order and corresponding to the accompanying data is connected to the bus. With the system known from EP 0 893 907 A1, it shall be possible to handle different copying orders without preparatory planning in any desired sequence. No preparatory sorting of the input media is carried out. The image data as determined by the reading means is transferred to the various output devices based solely on the accompanying data. The known system includes a collection device that is used to perform the sorting according to the orders. This means, that only at the end, that is, after all images of the respective orders have been generated and produced, an assignment of the generated images to the input media and other components of this order is carried out. Final processing with this known system is very extensive. In particular, freely selectable storage units ("memories") must be available for the various components of an order and any desired access to these memories must be ensured.

SUMMARY OF THE INVENTION

It is principal the object of the present invention to provide both a method and an apparatus for generating images which allows several different image production orders to be processed in a simple and effective manner.

This object, as well as other objects which will become apparent from the discussion that follows, are achieved, in accordance with the present invention, by providing a method and apparatus in which the previously read input media are physically sorted according to at least one prescribed criterion, and, thereafter, a sequence of the image data, determined previously for transferring the respective image data of the images, is determined for outputting the image information onto the recording material in dependence upon the sort, by orders, of the read input media.

According to the present invention, the input media as read by the reading means are sorted corresponding to the orders. This sorting action occurs based on at least one prescribed criterion. Input media may be photographic films or film strips, but also other storage media such as diskettes, CD-ROMs or chip cards that contain stored image data with the image information. A criterion for sorting the input media may be a priority for generating the images—that is, the need for rush processing—or the type of the image to be generated; that is, in particular, the type of the recording material. According to the invention, the image data containing the image information of the images as determined by the reading means is arranged in a certain sequence corresponding to the earlier performed sorting of the read input media according to each order. Based on this sequence, the respective image data of the images shall then be transferred to the output means for outputting the image information onto recording material. Due to the invention, it is advantageously not necessary to provide complicated memories with freely selectable access to the individual input media for the interim storage of the input media during final processing of the orders. Instead, image data with the image information of the images is assigned to a certain sequence with which it is transferred to the output means. This sequence by which the image information is output to the recording material is adapted to the sequence of the input media. Final sorting of the individual image generation orders, where the input media must be assigned to the various generated images, can thus be carried out in a simple manner. Extensive searching and assigning of individual input media to the images is thus no longer required.

In one advantageous embodiment of the invention, memories that are used to store the various input media of the image generation orders, sorted according to the orders, can be so-called FiFo (First-in-First-out) memories. With this type of memory, the input media that have been input into the memory will then be output according to the same sequence of the input. An input media that has been input first will thus be output first as well. Such FiFo memories can be produced with relative ease and in a cost-effective manner. Furthermore, many input media of various image generation orders can be stored in them using relatively little memory space.

In an additionally very advantageous embodiment of the invention, several memories for storing input media are present. In this manner, an additional flexibilization for the generation of images for various image generation orders can be achieved.

Such several memories for storing input media can be employed advantageously, particularly when image generation orders that require different recording materials must be processed using one and the same output means for outputting the image information. Such different recording materials may have, for example, different formats and/or different surfaces (glossy or matte). The several memories for storing input media are assigned to these different recording materials. Then, the sorting means sorts the read input media such that they are sorted into those memories that are assigned to the respective recording materials that are required for the execution of the image generation order that stems from the input medium. A change in the configuration of the output means, to replace a certain recording material with a different recording material, can advantageously occur when it is sensible to do so according to reasons of an effective production sequence for generating images.

However, it is also possible to utilize the several memories for storing input media for shortening the run time of particularly urgent orders. To this end, the several memories can receive different priorities for processing the image generation orders. It is, for example, possible to designate one memory for storing input media as a "surpassing memory" whose content is processed with priority. In this manner, logistic reasons for processing image generation orders can be taken into account as well. For example, orders that have a long transportation distance back to the client can be processed with a higher priority than orders that do not have to be transported such a long distance to the respective client. In this manner, clients that are located at a far distance can be served punctually with the completed image generation orders.

Advantageously, several of the memories for storing input media can be assigned to one single output means. This can be a fixed assignment. It is then possible to design the transport of the input media and/or of the generated images to the final processing station in a simple manner. It is not necessary, for example, to integrate complex switch junctions into the transport paths.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1–4 of the drawings. Identical elements in the various figures are designated with the same reference numerals.

Figure 1:
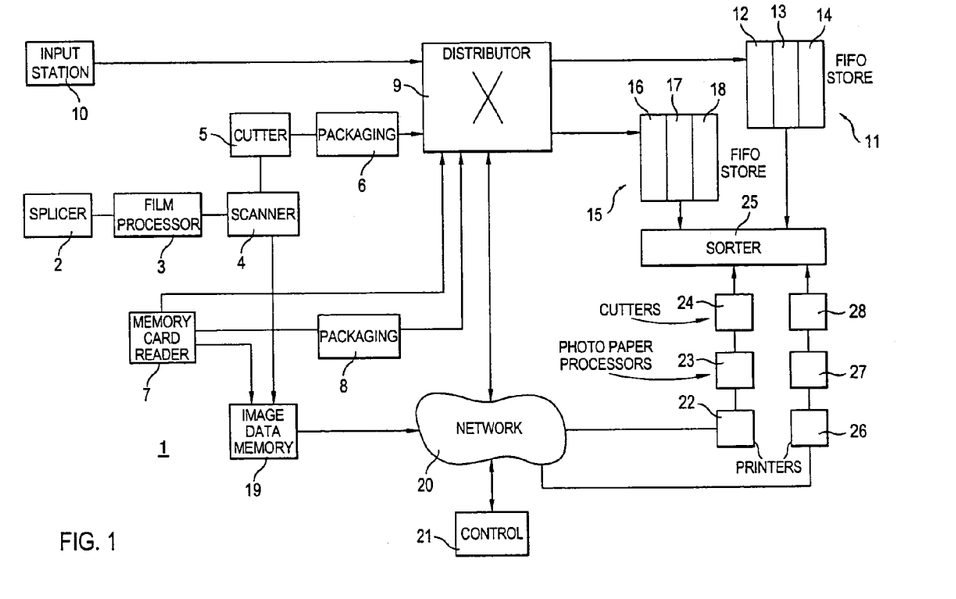
FIG. 1 is a block diagram of a first preferred embodiment of a system for generating images according to the invention.

FIG. 1 shows a system for generating and producing images. The system 1 can be used, for example, in a large-scale lab by generating images on recording material from the image information that is supplied to the large-scale photo lab on various input media. Such recording material can be photographic paper, for example. However, it is also possible to employ other recording materials, in particular paper that is capable of receiving ink.

The image information of the images is supplied to the system 1 on varying input media. Such input media can be photographic film, for example, but also other electronic storage media such as chip cards or diskettes, for example. Photographic films are combined to so-called batches. Such batches contain numerous connected individual films that are processed in rolls. To this end, the system 1 contains a so-called splicer 2 that connects the various photographic films into one batch. This creates a long band of photographic film. Such splicers for creating photographic film batches are known and will, therefore, not be described in detail. Following the splicer 2 is a film processor 3 that contains various chemicals that serve the purpose of developing the film band. In a film scanner 4, the image information of the individual images contained on the film band is read and image data is created that contain this image information. The general functionality of such film scanners is known as well and does not require further explanation here. The films read by the scanner 4 are then transferred to a so-called desplicer (not shown) for separating the film batches into the individual films of the image generation orders and then transferred to a cutting device 5 that cuts the individual films into film strips. The film strips are then transferred to a packaging machine 6, where the film strips of the respective image generation orders are packaged together in order pockets. Thus, a separate order pocket is assigned to each image generation order.

Following the packaging device 6 is a distribution means 9. This distribution means 9 is connected with several storage units or "memories" that serve the purpose of storing and holding the input media. In the present exemplary embodiment, two memories 11 and 15 follow the distribution means 9. These two memories 11 and 15 are so-called FiFo memories. However, it is possible to design the memories 11 and 15 in some other way. Furthermore, these two memories 11 and 15 are designed such that they can receive different types of input media. In particular, the film strips packed into the order pockets can be stored.

In addition to the film scanner 4, the system 1 includes an additional reading means for reading input media. In the present exemplary embodiment, this additional reading means is a memory card reader 7. Memory cards that have the image data of the individual images stored on them can be provided to this memory card reader 7. The memory card reader 7 and scanner 4 are listed here only as examples of reading means for reading the input media. It is, of course, also possible to provide additional or different reading means. After the memory card has been read by the memory card reader and the image data stored on the memory card has been obtained and determined, the memory cards are transferred to a packaging machine 8 that follows the memory card reader 7, where the memory cards are packaged in the order pockets as well. Thereafter, the memory cards that have been packaged in this manner are transferred to the distribution means 9 that distributes the packed memory cards to the two FiFo memories 11 and 15.

The distribution means 9 distributes the order pockets with the film strips or the memory cards according to certain criteria to the two memories 11 and 15. Such criteria can be specified according to accompanying information that can be obtained from the individual image generation orders and provided to the system 1 via an input station 10, for example. However, it is also possible that such accompanying information is stored on the memory card in addition to the image data of the individual images, such that it can be obtained using the memory card reader 7. The accompanying information obtained in such a manner is transferred from the input station 10 or the memory card reader 7 directly to the distribution means 9 in order to control the distribution of the various order pockets accordingly. It is also possible to assign a criterion for distribution of the input media to the various input media during the input into the system 1. For example, during the input into the system 1, each input medium can be assigned a particular processing priority. This processing priority is then taken into account by the distribution means during the distribution to the memories 11 and 15. In particular, accompanying information to be taken into account during distribution to the different memories can also be the type of photographic paper that is to be used for generating the individual images. For example, in the present exemplary embodiment as set forth in FIG. 1, memory 11 is assigned to photographic paper with a matte surface. On the other hand, memory 15 is assigned to a photographic paper with a glossy surface. Additionally, each of the two memories 11 and 15 is subdivided into three sub-memories. Memory 11 includes a first sub-region 12, a second sub-region 13 and a third sub-region 14. Memory 15 includes a fourth sub-region 16, a fifth sub-region 17 and a sixth sub-region 18. Different priorities that are used to distribute the individual image generation orders to the individual sub-regions 12 to 18 are assigned to the sub-regions 12 to 18 of the memories 11 and 15. The distribution means 9 distributes the order pockets, and thus, the input media contained in the pockets, of the individual image generation orders according to their assigned priorities to one of the sub-regions 12 to 14, as long as the images of the respective image generation orders are to be generated on matte photographic paper. The distribution means 9 distributes the order pockets of the individual image generation orders according to their assigned priorities to one of the sub-regions 16 to 18 as long as the images of the respective image generation orders are to be generated with photographic paper with glossy surfaces. The highest priorities are assigned to the first sub-region 12 of memory 11 and to the fourth sub-region 16 of memory 15. That is, the image generation orders that have the two sub-regions 12 and 16 assigned to them receive the highest priority such that their images can be generated quickly using the system 1. The two sub-regions 13 and 17 receive a medium priority 2, such that the orders with the input media that are stored in these two regions 13 and 17 assigned to them are processed with regular priority. Low priorities for processing the image generation orders are assigned to the sub-regions 14 and 18. Thus, input media stored in these sub-regions 14 and 18 stem from orders that are processed with low priority through the system 1. Orders with the high priority 1 receive, therefore, preferred processing treatment verses orders with regular priority 2 and low priority 3. Orders with a regular priority 2 assigned to them receive preferred processing treatment versus orders that have the low priority 3 assigned to them.

The system 1 includes an image data memory 19 that serves the purpose of storing the image data of the individual images obtained from the scanner 4 or the memory card reader 17. The image data memory 19 is connected to a network 20 that can be used to transmit the image data. The network is also used to transmit control and accompanying information. The network 20 is connected to the distribution means 9. The system 1 includes a control means 21 that is connected to the network 20 as well. This control means 21 in particular is used to control the image data transfer from the image data memory 19 via the network 20 to an output means for outputting the image information of the individual images contained in the image data onto photographic paper. The system 1 includes a printer 22 as such an output means. Here, this printer 22 is used to expose photographic paper. This printer may, for example, contain lasers whose laser beams are modulated based on the image data transferred to the printer 22 according to the image information contained in the image data. However, it is also possible to use other printers such as ink-jet printers that place ink onto paper suitable for this purpose. A paper processor 23 follows the printer 22, where said paper processor contains various chemicals that are used to develop and fix the photographic paper. The photographic paper that has been processed with the paper processor 23 is then transferred to a cutting device 24 that cuts the individual images from the band-shaped photographic paper. Such printers, processors and cutting devices are known and are, therefore, not described in detail at this point. The images generated in this manner are then transferred to a final sorting unit 25. The final sorting unit 25 is connected to the memories 11 and 15. The final sorting unit 25 recognizes when all images of one certain order are finished. The respective order pocket with the input medium that is assigned to this particular order is transferred to this final sorting unit 25 through the respective memory 11 or 15, such that the final sorting unit 25 can insert the finished individual images of this order into the corresponding order pockets.

To realize an effective and simple design of the final sorting unit 25, according to the present invention, information about the distribution of the individual input media is transferred to the two memories 11 and 15, via the network 20 to the control means 21. Thus, the control means 21 receives precise information from the distribution means 9 about the sequence of the input media that is stored in the memories 11 and 15, and in their sub-regions 11 to 15, or 16 to 18, respectively. Now, based on the information about the distribution of the input media, the control means 21 is capable to control the continued transfer of the image data from the image data memory 19 via the network 20 to the printer 22. The control means 21 will feed the image data to the printer 22 exactly in such a way that the final sorting unit 25 during completion of the images of a particular order can access the order pocket that is provided for this order and is stored next in the memory 11 or 15. Which of the two memories 11 and 15 the final sorting unit will access depends on the type of photographic paper (with matte or glossy surface) that has been used by the printer 22 for exposing the images of the order to be sorted. Information regarding the type of the respective photographic paper of the order can be provided to the final sorting unit 25 via a superordinate control means (not shown). However, it is also possible that the final sorting unit obtains this information from the control means 21. To this end, the final sorting unit can have a connection to the network as well.

In addition to the printer 22, the system 1 as set forth in FIG. 1 includes an additional printer 26 that is connected to the network 20 as well. This printer 26 is followed by an additional paper processor 27, which in turn is followed by an additional cutting device 28. The cutting device 28, in turn, is connected to the final sorting unit 25. The functionality of printer 26, paper processor 27 and cutting device 28 corresponds to that of printer 22, paper processor 23 and cutting device 24. This additional processing line, printer 26, processor 27 and cutting device 28, is used to increase the capacity of the system 1 in generating images. The control means is designed such that it can also call image data from the image data memory and feed them to the printer 26 according to a specified order.

Figure 2:
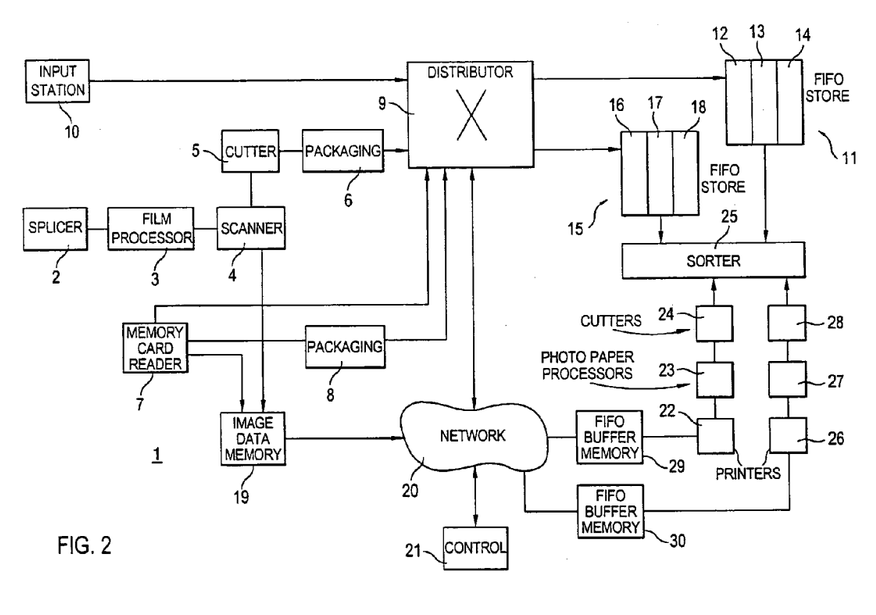
FIG. 2 is a block diagram of a second preferred embodiment of a system for generating images according to the invention.

FIG. 2 shows the second preferred embodiment of the system for generating images according to the invention. As set forth in FIG. 2, the system 1 includes an additional memory 29 or 30, respectively, between the network 20 and the two printers 22 and 26. These two memories 29 and 30 are used for interim storage of the image data after it has been called from the image data memory 19 by the control means 21. Memory 29 stores the image data of the images that are to be exposed onto photographic paper by the printer 22. Memory 30 stores the image data of the images that are to be exposed onto photographic paper by the printer 26. The two memories 29 and 30 are designed as so-called FiFo (First-in-First-out) memories. Thus the image data of the individual images is stored in the memories 29 and 30 exactly in the sequence in which they are to be exposed by the printers 22 and 26. In this case, the distribution of the image data from the memory 19 to the printers 22 and 26 is particularly simple and can be carried out without regard to a particular time.

Figure 3:
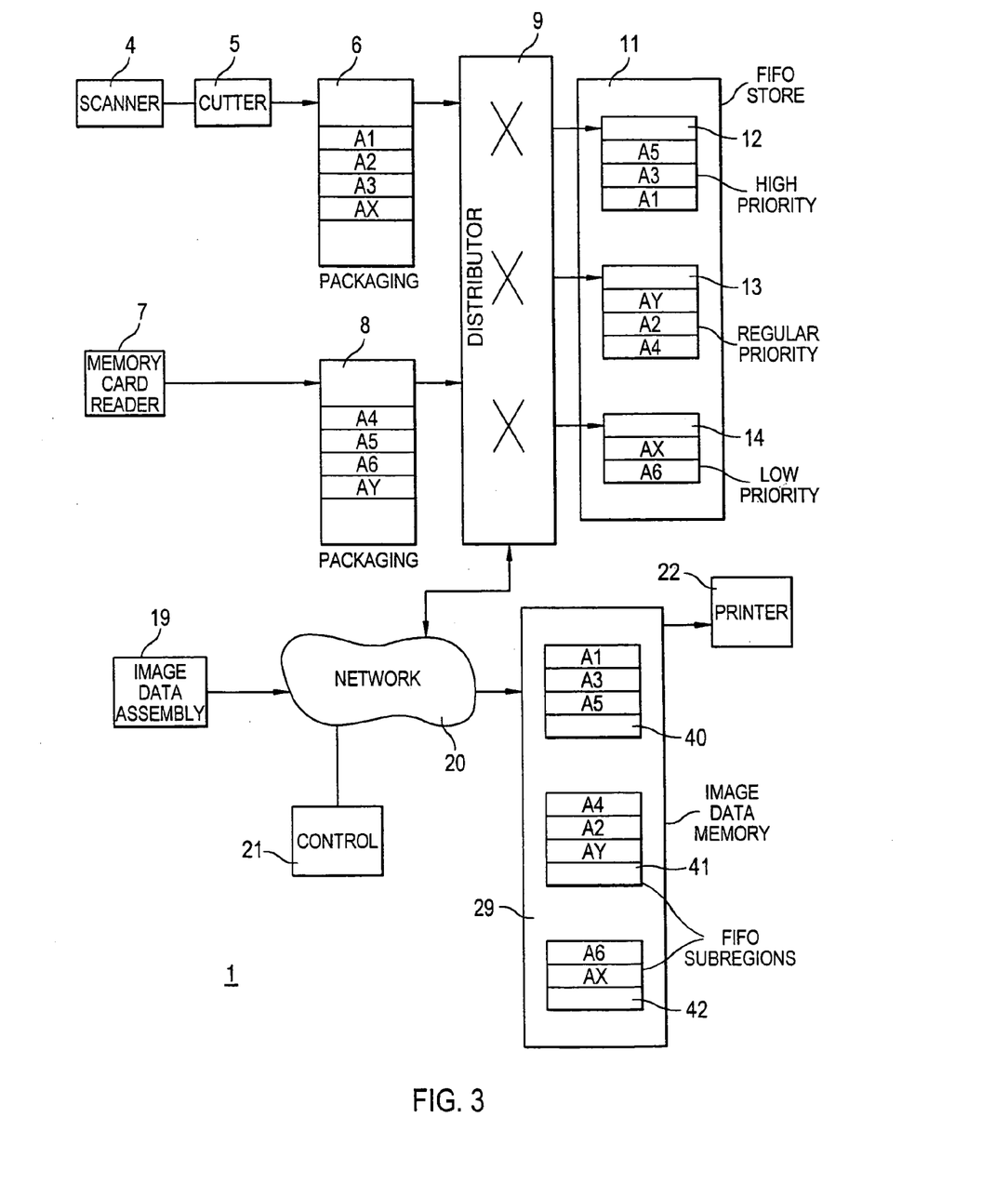
FIG. 3 is a schematic presentation of an embodiment for sorting and distributing input media to several memories for storing input media and the respective assignment and storing of the corresponding image data in a memory for storing image data.

FIG. 3 shows an example of the distribution of several input media that are assigned to various image generation orders A1 to A6, AX and AY to the sub-regions 12 to 14 of the memory 11 for storing of input media. FIG. 3 also clarifies how the image data of the images of these respective orders that is assigned to the various image generation orders A1 to A6, AX and AY is stored in the image data memory 29 (FIG. 2). Here, the memory 29 includes a first sub-region 40, a second sub-region 41 and a third sub-region 42. The three sub-regions 40 to 42 are designed as FiFo memories. This means that the image data of the individual images of the order that is input into each of the respective sub-regions is output from the respective sub-region in the sequence in which it has been input into the sub-region.

In the present example, the film strips of the individual orders transferred by the cutting device 5 to the packaging machine 6 are temporarily stored in the packaging machine 6. Such an interim storage is advantageous because it can ensure a decoupling between the distribution of the various order pockets through the distribution means 9 and the cutting of the films with the cutting device 5. However, it is not required to provide such a temporary storing of the film strips of the different orders.

In the present example as set forth in FIG. 3, the input media of the different orders are temporarily stored in the interim memory of the packaging machine 6 according to the sequence of their arrival at the packaging machine 6. In addition to the interim memory of the packaging machine 6, FIG. 3 also shows an additional interim memory that is a component of the packaging machine 8 for packaging the memory cards.

Both the film strips packaged with the packaging machine 6 and the memory cards packaged with the packaging machine 8 are distributed to the memory 11 using the distribution means 9. In the present example, the film strips of the orders A1, A2, A3 and AX that are packaged in the order pockets are stored in the interim memory of the packaging machine 6. In the present example, the film strips of the orders A4, A5, A6 and AY that are packaged in the order pockets are stored in the interim memory of the packaging machine 8. The interim memory of the packaging machine 8 allows for freely selectable access in the same manner as the interim memory of the packaging machine 6. The functionality of the two interim memories is the same.

In the present example as set forth in FIG. 3, the memory 11 also includes the three sub-regions 12 to 14 that have the different priorities 1, 2 and 3 assigned to them. FIG. 3 shows how the input media of the orders A1 to A6, AX and AY have been distributed to the sub-regions 12 to 14 of memory 11 using the distribution means 9. It is clear that the input media of the different orders A1 to A6, AX and AY, of course, can no longer be present in the interim memories of the two packaging machines 6 and 8 after they have been distributed into the sub-regions 12 to 14 of memory 11 using the distribution means 9. For reasons of presentation here in FIG. 3, they continue to be present in the interim memories of the two packaging machines 6 and 8. The three sub-regions 12 to 14 of memory 11 are designed as FiFo memories. In the present example, the input media of the orders A1, A3 and A5 have been assigned to the sub-region 12 in this sequence. The input media of the orders A4, A2 and AY have been assigned to the sub-region 13 in this sequence. The input media of the orders A6 and AX have been assigned to the third sub-region 14 in this sequence. The sequence of distribution to the three sub-regions 12 to 14 is communicated to the control means 21. This control means 21 can access the image data memory 19 corresponding to this sequence to transfer the image data of the individual images of the respective orders A1 to A6, AX and AY that are stored in this image data memory to the three sub-regions 40 to 42 of the memory 29. Corresponding to the arrangement of the input media of the respective orders A1 to A6, AX and AY in the sub-regions 12 to 14 of memory 11, in the present example, the image data of the images of the order A1, A3 and A5 has been stored in the first sub-region 40 in this sequence. Correspondingly, the image data of the images of the order A4, A2 and AY has been stored in the second sub-region 41 of the memory 29 in this sequence. The image data of the images of the order A6 and AX has been stored in the third sub-region 42 in this sequence. Since the memory 29 is connected to the printer 22 (FIG. 2), the image data of the images of the orders A1, A3, A5, A4, A2, AY A6 and AX can now be transferred in succession to the printer 22.

Figure 4:
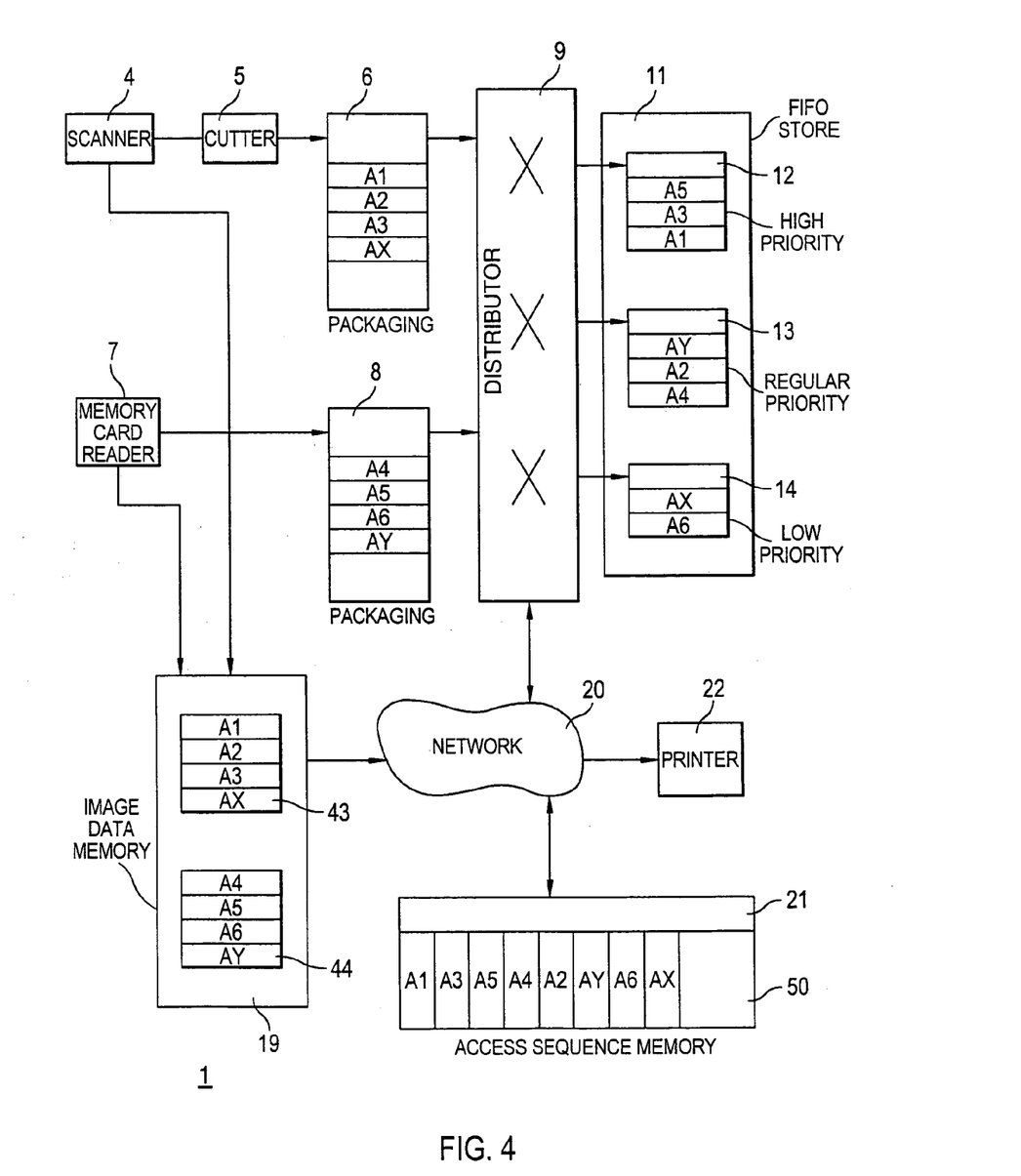
FIG. 4 is a schematic presentation of an additional embodiment of an access sequence to the image data assigned to the distribution of the image data.

FIG. 4 shows an additional example of how the input media and the image data of the different orders A1 to A6, AX and AY can be sorted. In the present example as set forth in FIG. 4, the distribution of the input media of the different orders to the sub-regions 12 to 14 of memory 11 is carried out according to the same distribution that has already been described for the example as set forth in FIG. 3. Different from the example as set forth in FIG. 3, the image data that is stored in the image data memory 19 is here not transferred to the memory 29. For this example as set forth in FIG. 4, the memory 29 is, however, not necessary.

FIG. 4 shows the image data memory 19, where the image data of the orders A1 to A6, AX and AY is stored. In the present example, the image data memory 19 is divided into two regions 43 and 44. The image data of those orders that are determined by the film scanner 4 and transferred to the memory 19 is stored in the first region 43. The image data of those orders that are determined by the memory card reader 7 and transferred to the memory 19 is stored in the second region 44. Thus the image data of the images of the orders A1, A2, A3 and AX is stored in the first region 43, and the image data of the images of the orders A4, A5, A6 and AY is stored in the second region 44.

In the present example, the control means 21 is designed such that it includes a memory region 50 that can store an access sequence. Specified in this access sequence is the sequence in which the image data of the images of the different orders that are stored in the memory 19 are transferred via the network 20 to the printer 22. Here, the memory region 50 of the control means 21 contains the sequence of the image data of the orders that is to be transferred to the printer 22 corresponding to the sequence of the input media that are stored in the various sub-regions 12 to 14 of memory 11. Here, the access sequence to the image data of the orders specified in the memory region 50 is, therefore, A1, A3, A5, A4, A2, Ay, A6 and AX. This is the sequence in which the control means 21 accesses the memory 19 and transfers the corresponding image data of the images of the next order via the network 20 to the printer 22. Resorting the image data in an interim memory, like memory 29, for example, is not necessary.

Based on the present invention, it is possible to subsequently change the sequence of the orders to be processed. Using a superordinate control means (not shown) of the system 1, it can be initiated, for example, that an input media of a particular order is resorted from one sub-region, e.g., sub-region 13, into another sub-region, e.g., sub-region 12. This can occur when the priority for processing an order is subsequently changed. Resorting of the input media is communicated to the control means 21. Thereupon, the control means 21 initiates a corresponding resorting of the access sequence in the memory region 50 (FIG. 4), or a corresponding resorting in the memory 29 (FIG. 3) that is located before the printer 22. However, in this case, the memory 29 would have to be designed such that such a subsequent resorting would be possible. In this manner, an extremely flexible and effective system with a simple design for generating images is created.

There has thus been shown and described a novel method and apparatus for generating images which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for generating images comprising, in combination:
   (a) reading means for reading image information of several images (A1 to A6, AX, AY) contained on physical input media, and for producing image data that includes the read image information, wherein the input media are assigned to several image production orders;
   (b) output means for outputting image information onto recording material corresponding to image data that is transferred to the output means;
   (c) sorting means for physically sorting by production order the previously read input media according to at least one prescribed criterion;
   (d) control means for determining an order of the image data that is transferred to the output means corresponding to the sorting by production orders of the read input media; and
   (e) a storage unit for storing the input media of the several image production orders corresponding to the sorting according to the orders.

2. The device set forth in claim 1, further comprising a memory for storing image data with the image information of the images (A1 to A6, AX, AY) of the production orders, and wherein the control means controls a sequential storing of the respective image data of the images (A1 to A6, AX, AY) corresponding to a particular sequence in the memory.

3. The apparatus set forth in claim 1, further comprising a memory for storing image data with the image information of the images (A1 to A6, AX, AY) of the production orders, and wherein the control means accesses the image data of the images (A1 to A6, AX, AY) stored in the memory corresponding to a particular sequence.

4. The apparatus set forth in claim 1, wherein the storage unit for storing the input media is a First-in-First-out storage unit.

5. The apparatus set forth in claim 1, further comprising a plurality of storage units for storing the input media of the several image production orders corresponding to the sorting according to the orders.

6. The apparatus set forth in claim 5, wherein a plurality of said storage units for storing the input media are assigned to one single output means.

7. The apparatus set forth in claim 5, wherein the control means controls the storing of the input media in said plurality of storage units and wherein said storage units are assigned to different recording materials onto which the image information can be output with the same output means.

8. The apparatus set forth in claim 5, wherein the control means controls the storing of the input media in said plurality of storage units, and wherein different priorities for generating images are assigned to the several storage units.

* * * * *